Feb. 14, 1933.   A. DOW   1,897,244

POWER TRANSMISSION MECHANISM

Filed Dec. 2, 1930   2 Sheets-Sheet 1

INVENTOR.
Alexander Dow
BY James L. Stewart
ATTORNEY.

Feb. 14, 1933.                    A. DOW                    1,897,244
                      POWER TRANSMISSION MECHANISM
                         Filed Dec. 2, 1930           2 Sheets-Sheet 2
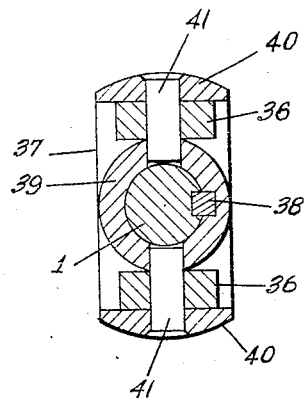
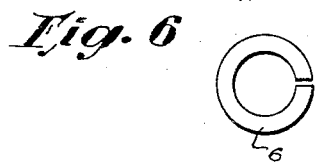
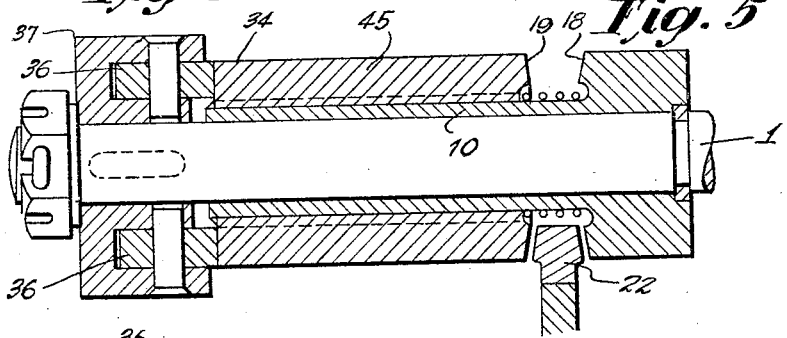
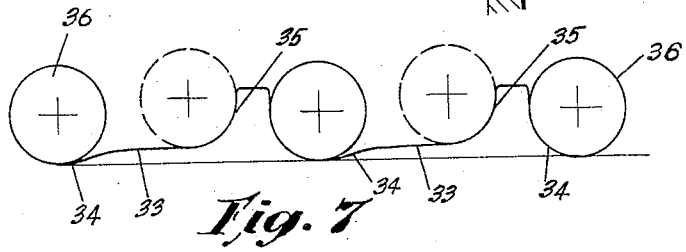
INVENTOR.
Alexander Dow
BY James L. Stewart
ATTORNEY.

Patented Feb. 14, 1933

1,897,244

UNITED STATES PATENT OFFICE

ALEXANDER DOW, OF NEW YORK, N. Y., ASSIGNOR TO DOW PATENTS HOLDING CORPORATION, A CORPORATION OF DELAWARE

POWER TRANSMISSION MECHANISM

Application filed December 2, 1930. Serial No. 499,438.

This invention relates to a method as well as an apparatus suitable for power transmission. In this application for patent, the subject matter will be illustrated as the same relates to mechanism adapted for the starting of internal combustion engines and that type of starting mechanism wherein a pair of cooperating gripping elements mounted on an armature shaft of a starting motor are adapted to grip and drive a suitable ring secured to a flywheel, oppositely disposed faces of which are adapted to be interposed between said gripping faces, all of which cooperate primarily to crank the engine and, as a secondary operation, to release the starter mechanism from operative engagement after the engine has been started.

The primary object of the present invention may be briefly stated to be that of providing means effectually to cause gripping faces to automatically tightly grip and drive the flywheel and to automatically compensate for any surface irregularities that may develop, either on the ring or on the gripping faces, thus avoiding loss of efficiency or dependability through a long period of intermittent operation. The assembly contemplates the interposition of elastic means in the operation of the mechanism so that in the initial gripping operation and during the subsequent driving operation, the whole mechanism is internally elastically associated, thus operating to cause the gripping mechanism to continuously bear upon the surfaces of the ring under a resilient pressure, and operating in like manner to flexibly yield to any irregularity found on the opposed surfaces, and in like manner compensating for any irregularities or change of relation due to wear which may occur between the gripping elements in the course of the operation of the mechanism. The apparatus referred to herein relates particularly to the mechanism disclosed, whereas a method of operation is found in so combining and controlling the elements of the apparatus as to secure an elastic or resilient engagement operating automatically in conjunction with the apparatus referred to.

Another and further attribute of the apparatus disclosed herein resides in the fact that the gripping elements or cones are caused to moved towards one another axially until the necessary driving pressure has been applied by the two driving cones to the driven ring, after which the driving cones, revolving at the same speed, drive the ring. The advantage of this arrangement resides in the fact that a more satisfactory driving engagement is accomplished under the conditions referred to, that is to say, where both gripping elements are brought into driving relation with the interposed ring without rotation, and after this is accomplished, driving the ring, so that when they are brought into gripping engagement by the disclosed mechanism, a gripping contact is accomplished under conditions which may be characterized as static conditions, as opposed to conditions previously illustrated in the art where one of the gripping elements is caused to take on a primary rotary motion of a greater speed than that which is imparted to the opposing gripping element. Under the latter conditions, it will be noted that the gripping elements are brought into engagement with the ring under conditions where one gripping element is rotating faster than the other. As previously stated, under the present application it is found advantageous to cause the gripping elements to accomplish a gripping engagement under said static conditions rather than under conditions which may be characterized as kinetic conditions, that is to say, where the primary gripping element is revolving at a high rate of rotation at the moment when the secondary gripping element engages the ring. It has been observed that under the conditions characterized as static as above, there is less likelihood of wear either on the ring or the gripping elements. This is probably due to the fact that when the rapidly revolving primary cone is brought in contact with one face of the ring which is stationary, it is possible that a cutting or wearing operation may be incident to such contact, whereas under conditions above described where the gripping elements engage the ring at the same instant while at rest, there is less likelihood of any abrasion due to the kinetic action of one surface on the other.

The present invention embodies numerous features of novelty, which will be apparent from the hereinafter detailed description and claims, when read in conjunction with the accompanying drawings.

The accompanying drawings illustrate one practical embodiment of the invention, but the construction therein shown is to be understood as illustrative only, and not as defining the limits of the invention.

Figure 4 is a section on the line 4—4 of Figure 1.

Figure 5 is a section on the line 5—5 of Figure 1.

Figure 6 is an elevation of a split ring employed in the structure of Figures 1 and 2.

Figure 7 shows the development of certain cam faces of the structure.

Figure 8 is a central horizontal section of a starter mechanism showing a modified form of the present invention characterized more particularly by the omission of the resilient element and the formation of the secondary sleeve and the cam member integral with respect to one another.

Figure 1:
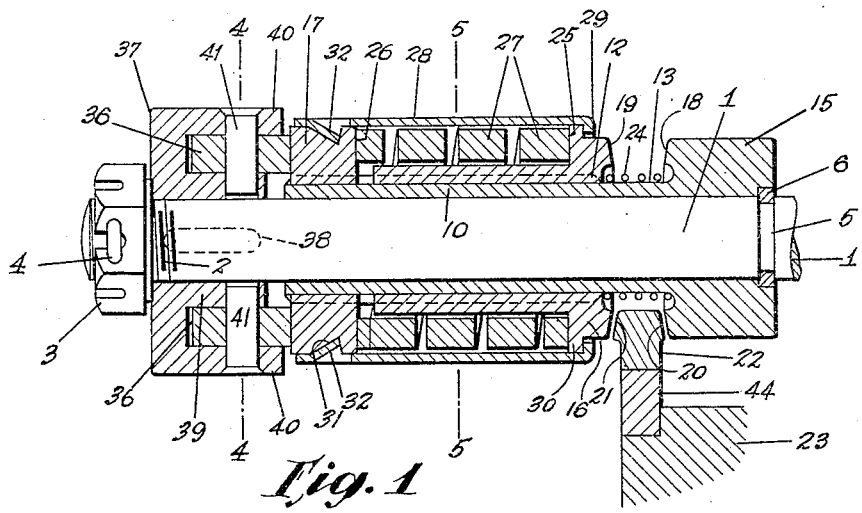
Figure 1 is a central horizontal section of a starting mechanism embodying the present invention, certain of the parts being shown in plan in the interest of clearness. In this figure the parts are shown in normal idle condition.

Referring to the drawings, 1 indicates the armature shaft of an electric starting motor of any appropriate conventional form embodying suitable bearings in which the shaft 1 is supported for rotation and for longitudinal or axial movement.

The construction illustrated herein is what is technically known as the inboard bearing structure, contra-distinguished from what is known as the outboard bearing. In the inboard type, the outer end of the armature shaft is unsupported, whereas in the outboard type said outer end is carried by a bearing. Examples of these two types are fully illustrated in pending applications by the same inventor, as follows: Ser. No. 452,502, filed May 14, 1930, "starter mechanism for internal combustion engines", and Ser. No. 454,566, filed May 22, 1930, "starter mechanism for engines". It is therefore deemed unnecessary in this case either to illustrate or describe the mounting of shaft 1 in detail as it may be supported according to either type.

In practice, the end-play ordinarily found in the armature shaft of an electric motor will provide sufficient axial movement of the shaft 1 to fulfill the requirements of this invention. The outer end of said shaft is threaded at 2 to receive a nut 3 which is adjustable upon the threads 2 and may be locked in desired adjustment by a pin or cotter key 4 adapted to be passed through the castellations of the nut and through a perforation provided in the shaft for this purpose. The nut 3 constitutes what may be termed an adjustable abutment and is adapted to initially adjust the parts of the starter mechanism as will hereinafter be more fully explained.

The shaft 1 is provided adjacent but exteriorly of the motor housing with an annular channel 5. Into this channel is fitted a split ring 6 shown in detail in Figure 6. This ring is made to closely seat within the confines of the channel 5. The ring 6 constitutes in the assembly a relatively fixed abutment with respect to the adjustable abutment formed by the castellated nut 3.

Positioned on the shaft 1 between the abutments 3 and 6 is a sleeve 10. This sleeve is of a length somewhat less than the distance between said abutments 3 and 6, and is provided with a smooth axial cylindrical bore of a diameter to have a free rotary and slidable fit on the shaft 1. The sleeve 10 is thus adapted for relative rotary and longitudinal sliding movement on the shaft, there being no direct mechanical connection between these parts.

The sleeve 10 is provided at one end with an enlargement 15 constituting one of the gripping members and for the greater part of the remainder of the length of said sleeve it is provided with exterior splines 12 shown best in Figures 1 and 5. The splines terminate short of the gripping member 15 so as to leave an intermediate smooth cylindrical section 13 as shown in Figure 1. The gripping member 15 is exhibited as integral with the sleeve 10, but it may be made separate and rigidly mounted thereon without departing from this invention.

The splined section 12 of the sleeve 10 forms a support for the second gripping member 16 and a cam member 17. The gripping member 16 is coaxial with and has a splined relation with respect to the sleeve 10 and is mounted thereon for axial sliding movement on and with respect to said sleeve. The gripping members 15 and 16 have opposed gripping faces 18 and 19 respectively, which are preferably of frusto-conical form, and are adapted, when acted upon in the manner hereinafter described, to engage with the complementary faces 20 and 21 of a ring 22 mounted on the flywheel 23 of the associated engine. A spring 24 embraces the sleeve intermediate the gripping members 15 and 16 and the opposite ends of said spring bear against said members to normally force them apart in order that the gripping faces 18 and 19 of said members may be normally free from contact with the cooperating faces 20 and 21 of the flywheel ring 22. The member 17 is arranged coaxially of the sleeve and shaft, has a splined relation with respect to the sleeve 10, and is mounted for axial sliding movement upon and relative to said sleeve. The gripping member 16 is relatively long to provide a long sliding bearing on the sleeve 10, and is exteriorly stepped to form a shoulder 25. This shoulder is spaced from the adjacent face 26 of the cam member 17 which forms an opposing shoulder and between these shoulders is positioned a strong helical spring 27.

Figure 2:
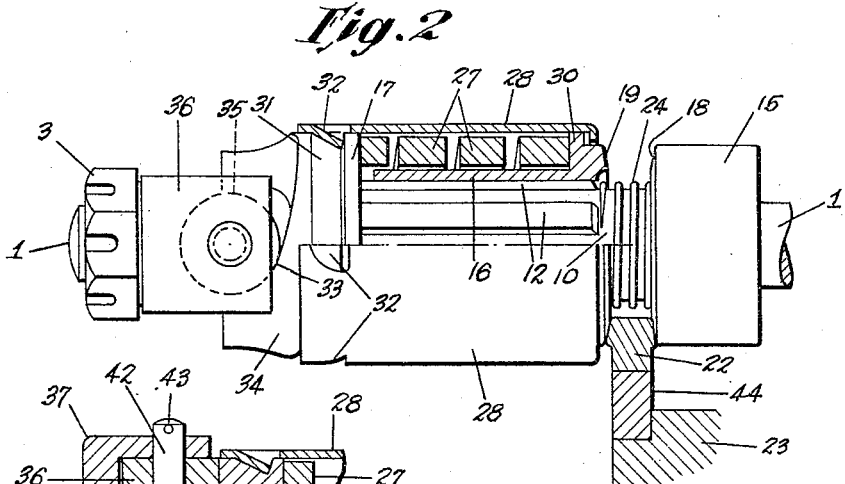
Figure 2 shows the structure of Figure 1, partly in plan and partly in central horizontal section. In this view the mechanism is shown in starting or driving position.

This spring is preferably maintained under a predetermined compression by a suitable cage shown as comprising a tubular section 28 provided at one end with a flange 29. This flange cooperates with a flange 30 formed on the member 16 as shown in Figures 1 and 2. The member 17 is provided with an annular groove 31 into which from the wall of the cage tongues 32 are pressed as clearly shown. The parts are assembled so as to place the spring 27 under compression, and thereafter the cage, acting through the flange 29 and tongues 32, serve to normally maintain this compression. It is to be noted, however, that the members 16 and 17 may be moved toward one another to further compress the spring 27, as is illustrated for example in Figure 2.

The outer end of the cam member 17 has formed thereon a cam face preferably embodying two diametrically opposed cam surfaces. From the diagram shown in Figure 7, it will be observed that each of these cam surfaces is in the form of a simple helix 33 which extends from an arcuate depression or indenture 34 to an arcuate abutment 35. Both the depression 34 and the abutment 35 are curved in the arc of a circle, the radius of which is preferably substantially the same as the radius of a roller 36 forming part of a cam follower. There are two such rollers 36 and they are carried by a yoke 37.

According to Figures 1 and 2 the yoke is mounted on the shaft 1 and is keyed at 38 to have a sliding fit thereon. The yoke may thus be axially adjusted by the nut 3. Said yoke has a hub 39 and two arms 40 and the rollers 36 are positioned between the hub and said arms so that pins 41 passed through the arms and into the hub will serve to support the rollers for rotation.

Figure 3:
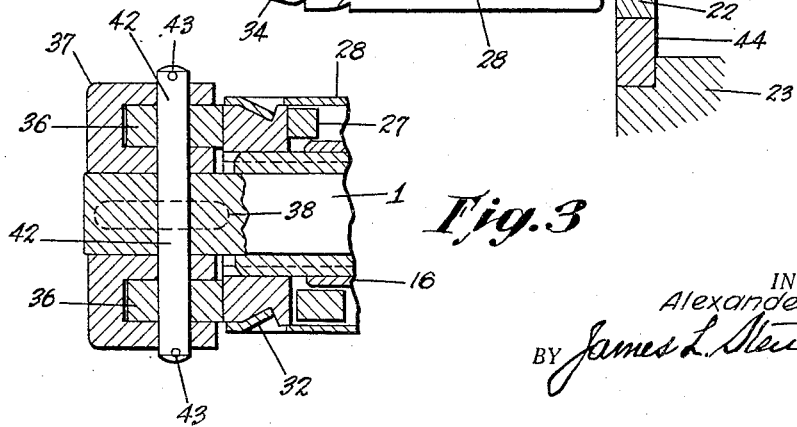
Figure 3 is a fragmental central section of a modified form of construction.

According to Figure 3, the yoke is formed in the same manner and keyed to the shaft, as in Figure 1, but pin 42, which corresponds to the pins 41, extends uninterruptedly through the shaft to lock the yoke against axial movement. The pin 42 may be secured in place in any suitable way as by cotters passed through perforations 43.

In either construction, the rollers 36 are circular in form and cooperate with the two oppositely disposed cams 33 and associated depressions and abutments 34 and 35.

Under ordinary conditions, that is, when the starter is not in operation, the parts are in the relative positions exhibited in Figure 1. When thus positioned, the rollers 36 of the cam follower rest in the depressions 34 as shown in Figure 7. The spring 27 is under minimum compression within its cage 28, and the gripping member 16 and cam member 17 are moved to the left in Figure 1 to free the face 19 from the surface 21 of the flywheel ring. The spring 24 is effective to hold these parts in said positions and also to hold the face 18 of the gripping member 15 free from engagement with the face 20 of the flywheel ring. In other words, the spring 24 holds the cone surfaces 18 and 19 separated. Any suitable means, such for example as a spring associated with the shaft 1, as illustrated in my Patent No. 1,760,483, issued May 27, 1930, may be utilized to centralize the opening between the conical faces 18 and 19 with respect to the flywheel ring 20 by normally maintaining the retainer 6 against the adjacent end of the motor casing.

The relationship of the parts as described persists at all times when the starter mechanism is inactive or out of operation. However, when it is desired to place the starter in operation for the purpose of starting the associated engine, the following sequence of operations occurs. As the starting motor is energized, its armature starts to rotate with very rapid acceleration, thereby starting and rapidly accelerating the rotation of the armature shaft 1. As the shaft rotates it carries with it the cam follower 37 which is keyed thereto. The inherent inertia, however, of the sleeve 10, the gripping members 15 and 16, the cam member 17, the spring 27, and the cage 28, causes all of these parts to momentarily remain at rest. As a result of the inertia of these parts, the rollers 36 of the cam follower ride out of the depressions or indentures 34 and thence ride up on to the cam surfaces 33. In so doing they force the cam member 17 axially in the direction of the flywheel ring. As the cam member 17 is axially impelled, as stated, it carries with it the spring 27 and its cage 28, and the spring in turn moves the gripping member 16 to cause its conical face 19 to engage with the flywheel ring face 21. As these two faces come into engagement further action to bring about movement of these parts in the said direction effects a reaction of said parts against the cam follower, and this reaction is imposed upon the shaft 1 to axially move it to the left in Figure 1, carrying with it the gripping member 15 to cause the conical face 18 of said gripping member to engage with the flywheel ring face 20. While the two faces 18 and 19 are being engaged with the flywheel, the rollers 36 of the cam follower are continuing their travel up the cam surfaces 33, and as they continue this travel, they proceed to place the spring 27 under sufficient compression to insure an effective driving relation between the gripping members and the flywheel ring. By the time the rollers have traversed the length of the cam surfaces 33, the spring 27 has been placed under adequate compression to more than satisfactorily hold the gripping relation to which I have referred, and said rollers thereupon come into firm abutting relation with the abutments 35 (see Fig. 7), which serve to preclude further relative rotation in said direction between the cam follower and the cam member 17. The parts are at this time in the relative positions shown in Figure 2, and when this occurs there is a positive connection between the shaft and the sleeve, with the result that the sleeve is positively driven and consequently the gripping members 15 and 16 are likewise positively driven for the purpose of imparting relative movement to the flywheel ring to the end that the engine is cranked. This operation continues until the engine starts and runs under its own power. When this occurs the speed of the flywheel and its ring 22 will obviously be considerably greater than the speed of the gripping members 15 and 16. Consequently the flywheel ring will drive the gripping members and the sleeve 10 faster than the speed of the shaft 1 and cause the cam member to run away from the cam follower, with the result that the rollers 36 will back down off of the cam surfaces 33 and re-enter the depression 34, thereby releasing the flywheel ring and permitting the parts to reassume the inactive positions shown in Figure 1.

It will be noted from the foregoing description of the operation of this mechanism that it embodies numerous novel features which are a pronounced departure from prior practice. Note, for example, that as the cam follower operates, it does not operate directly upon either of the gripping members, but on the contrary it acts upon a collar 17 which is rotatably fixed with respect to the sleeve 10 so that the cam follower drives the sleeve 10, which serves not only to rotate the gripping members 15 and 16 but also to secure these members together against relative rotation. This arrangement materially minimizes driving strains and equalizes the transmission of power to the respective parts in a manner to insure the most positive and efficient operation.

Particular attention is called to the fact that a resilient element, in the form of a spring 27, is interposed in the chain of elements so that the action of the cam and follower to force the gripping member 16 into gripping relation with the ring 20, as well as the reaction which brings about gripping relation between the member 15 and said ring are both accomplished through compression of said spring. In other words, the gripping and driving of the ring 20 are accomplished through elastic pressure and this pressure may be adjusted through manipulation of the nut 3.

In practice, the parts are preferably initially adjusted so that when the gripping members 15 and 16 are in driving engagement with the ring, the spring 27 will be under greater compression than is actually required for such driving engagement. Thus, in the event of wear between the operating parts, the spring will automatically compensate therefor so that periodic adjustment or maintenance is not required with the starter of this invention.

The apparatus is sufficiently rugged to readily withstand the strains and wear incident to long intermittent use, but at the same time the arrangement is such that these parts may be made astonishingly light for an apparatus of this kind. The wear is, by the structure described, so equalized that it is practically uniform throughout and is not borne directly and excessively by any one or more parts. In practice, the operation of the device is noiseless, and a novice may energize the starting motor while the engine is running without causing any damage whatsoever to the structure.

Also note that the relation of the parts is such that the gripping members 15 and 16 may, according to this invention, remain practically stationary as to rotation until they are brought into gripping relation with the flywheel ring and until the spring 27 has been placed under adequate compression to insure efficient driving relation between the parts, at which time the rollers 36 engage with the abutments 35 to effect a positive drive for the starting operation.

As hereinbefore referred to, the ring 22 is mounted upon the flywheel 23. This may, if desired, be accomplished by forming the ring directly upon the flywheel as an integral part thereof, or by making the ring 22 separate from the flywheel and mounting the same directly upon a suitable seat formed thereon. However, in associating the invention with various stock cars, where flywheel diameters differ, I have found that a very satisfactory assembly may be accomplished by first mounting upon the flywheel a suitable adapter 44, and then mounting the ring 22 upon the adapter as shown in Figure 1, and in such manner that the ring, adapter and flywheel will all be locked together for simultaneous rotation as a unit. The utilization of an adapter for the mounting of the ring upon the flywheel is an important practical expedient and forms part of this invention.

In the foregoing detailed description of the invention, as exhibited more particularly in Figures 1, 2, 3 and 5 of the drawings, the secondary sleeve 16 and the cam member 17 are made separate from one another and are both splined to the primary sleeve 10 with a spring 27 interposed between the secondary sleeve and the cam member. This is the preferred form of construction. A modified form of construction, however, is shown in Figure 8. In this modified form of construction the secondary sleeve, designated 45, is substituted for the secondary sleeve 16, the cam member 17, the spring 27 and the cage 28. Thus as shown in Figure 8, the secondary sleeve 45 is splined upon the primary sleeve 10 so as to be locked to the sleeve 10 for simultaneous rotation therewith, while said sleeves are adapted for relative axial movement. The gripping face 19 is formed at one end of the secondary sleeve 45, while the cam faces 33, 34 and 35 are formed at the opposite end of the secondary sleeve 45. As a result of this modified construction the cam follower, acting upon the cam faces in the manner hereinbefore described, will act directly upon the primary sleeve 45 instead of upon the primary sleeve through an intermediate resilient element, as in Figure 1. In other words, in the structure of Figure 8 the cam follower will act directly and positively upon the primary sleeve to force the gripping faces 18 and 19 into driving engagement with the flywheel ring as will be clearly understood.

From the foregoing detailed description one practical embodiment of the invention has been set forth in detail, but I am aware, however, that the invention is susceptible to modifications in mechanical embodiment without departing from the invention, the scope of which is to be understood as fully commensurate with the appended claims.

I claim:

1. In a power transmission mechanism, the combination of a driving shaft, a pair of gripping members mounted on said shaft in spaced apart relation and free for rotation relative to the shaft, a driven member projecting between the gripping members to be gripped and driven thereby, means for securing the gripping members against rotation relative to one another while permitting relative axial movement between said members into and out of engagement with said driven member, a cam member secured to the gripping members against relative rotation with respect thereto, a resilient element operatively interposed between the cam member and one of the gripping members and a cam follower mounted on the shaft and coacting with said cam member, said follower being secured to the shaft against rotation relative thereto.

2. In a power transmission mechanism, the combination of a driving shaft, a pair of gripping members mounted on said shaft in spaced apart relation and free for rotation relative to the shaft, a driven member interposed between the gripping members to be gripped and driven thereby, means for securing the gripping members against rotation relative to one another while permitting relative axial movement between said members into and out of engagement with said driven member, a cam member secured to the gripping members against relative rotation but free for relative axial movement with respect thereto, a spring interposed between said cam member and the adjacent gripping member, and a cam follower mounted on the shaft and coacting with said cam member, said follower being secured to the shaft against rotation relative thereto.

3. In a power transmission mechanism, the combination of a driving shaft, a pair of gripping members mounted on said shaft in spaced apart relation and free for rotation relative to the shaft, a driven member interposed between the gripping members to be gripped and driven thereby, means for securing the gripping members against rotation relative to one another while permitting relative axial movement between said members into and out of engagement with said driven member, a cam member secured to the gripping members against relative rotation but free for relative axial movement with respect thereto, a spring interposed between said cam member and the adjacent gripping member, and a cam follower mounted on the shaft and coacting with said cam member, said follower being secured to the shaft against rotation relative thereto, said spring being normally under less compression than it is required to have to effect a driving engagement between the gripping members and the driven member.

4. In a power transmission mechanism, the combination of a driving shaft, a pair of gripping members mounted on said shaft in spaced apart relation and free for rotation relative to the shaft, a driven member interposed between the gripping members to be gripped and driven thereby, means for securing the gripping members against rotation relative to one another while permitting relative axial movement between said members into and out of engagement with said driven member, a cam member secured to the gripping members against relative rotation but free for relative axial movement with respect thereto, a spring interposed between said cam member and the adjacent gripping member, and a cam follower mounted on the shaft and coacting with said cam member, said follower being secured to the shaft against rotation relative thereto, said spring being normally under less compression than it is required to have to effect a driving engagement between the gripping members and the driven member, and a cage for holding said spring under a predetermined minimum compression when the driving shaft is at rest and the gripping members free from driving engagement with the driven member.

5. In a power transmission mechanism, the combination of a driving shaft, a pair of gripping members mounted on said shaft in spaced apart relation and free for rotation relative to the shaft and secured together against relative rotation, a driven member interposed between said gripping members to be gripped and driven thereby, and cam operated means for forcing said gripping members into gripping relation with the driven member, said means including a resilient element which, when the gripping members are in driving relation, is under sufficient compression to maintain such driving engagement.

6. In a power transmission mechanism, the combination of a power shaft, a sleeve having a smooth cylindrical bore embracing said shaft and free for rotation thereon, a pair of spaced apart gripping members mounted on said sleeve against rotation relative to the sleeve or to one another, one of said members being slidable axially on the sleeve, a cam member also mounted on the sleeve for axial sliding movement thereon and locked against rotation relative thereto, a cam follower co-acting with the cam member and secured directly to the shaft to be bodily rotated thereby, a resilient element interposed between the cam member and the adjacent gripping member, and a driven member interposed between the spaced apart gripping members.

7. In a power transmission mechanism, the combination of a power shaft, a pair of gripping members secured against rotation relative to one another but free for axial movement with respect to one another, said members being mounted coaxially upon the power shaft for free collective rotary movement thereon, operative connections between the gripping members for forcing said gripping members toward one another, said operative connections including a cam, a cam follower and a resilient element, and a driven member interposed between said gripping members and adapted to be gripped and driven thereby when the resilient element has been placed under sufficient compression to effect a driving engagement between the gripping members and the driven member.

8. A starting mechanism for internal combustion engines embodying a starting motor having an armature shaft, a pair of gripping members mounted on said shaft in spaced apart relation and free for rotation relative to said shaft, means for securing the gripping members against rotation relative to one another, while permitting relative axial movement between said members, a cam member secured against rotation to both of the gripping members, a cam follower mounted on said shaft and coacting with said cam member, said follower being secured to the shaft against relative rotation, and a flywheel ring interposed between the gripping members to be gripped and driven thereby.

9. A staring mechanism for internal combustion engines embodying a starting motor having an armature shaft, a pair of gripping members mounted on said shaft in spaced apart relation and free for rotation relative to said shaft, means for securing the gripping members against rotation relative to one another, while permitting relative axial movement between said members, a cam member secured against rotation to both of the gripping members, a cam follower mounted on said shaft and coacting with said cam member, said follower being secured to the shaft against relative rotation, a spring interposed between the cam member and one of said gripping members, and a flywheel ring interposed between the gripping members to be gripped and driven thereby.

10. In a power transmission mechanism, the combination of a driving shaft carrying a shoulder, a primary sleeve mounted for free rotation on said shaft and carrying a gripping member mounted at one end of said sleeve, said latter end of the sleeve bearing against the shoulder on the shaft, a cam member with a cam face splined to the opposite end of said sleeve, a secondary sleeve splined on an intermediate portion of said primary sleeve for axial movement on said primary sleeve and carrying at one end thereof a gripping member opposed to and spaced from the gripping member of the primary sleeve, a driven member interposed between said gripping members, and adapted to be gripped and driven thereby, a spring interposed between said cam member and the gripping member of the secondary sleeve, a cam follower secured to said driving shaft for rotation therewith, and positioned to cooperate with the cam face of said cam member so that, when the cam follower is rotated, it will ride up on said cam face to shift the gripping members into engagement with the interposed driven member and thereupon compress said spring until an elastic driving engagement is accomplished between the gripping members and the driven member.

11. In a power transmission mechanism, the combination of a driving shaft carrying a shoulder, a primary sleeve mounted for free rotation on said shaft and carrying a gripping member mounted at one end of said sleeve, said latter end of the sleeve bearing against the shoulder on the shaft, a cam member with a cam face splined to the opposite end of said sleeve, a secondary sleeve splined on an intermediate portion of said primary sleeve for axial movement on said primary sleeve and carrying at one end thereof a gripping member opposed to and spaced from the gripping member of the primary sleeve, a driven member interposed between said gripping members, and adapted to be gripped and driven thereby, a spring interposed between said cam member and the gripping member of the secondary sleeve, a cam follower secured to said driving shaft for rotation therewith, and positioned to cooperate with the cam face of said cam member so that, when the cam follower is rotated, it will ride up on said cam face to shift the gripping members into engagement with the interposed driven member and thereupon compress said spring until an elastic driving engagement is accomplished between the gripping members and the driven member, and a stop positioned on the cam member for engagement by the cam follower after said elastic driving engagement has been accomplished to permit the cam follower to positively drive the cam member when engaged with said stop.

12. In a power transmission mechanism, a driving shaft provided with two spaced apart abutments between which are positioned the following elements:—a primary sleeve rotatably embracing the shaft and carrying spaced apart gripping and cam members which are relatively axially movable and rotatable as a unit, a secondary sleeve embracing the primary sleeve between said cam and gripping members and carrying a gripping member opposed to and spaced from the gripping member of the primary sleeve, said secondary sleeve being slidable longitudinally of and rotatable with the primary sleeve, a spring coaxial with the shaft and interposed between the cam member and the gripping member of the secondary sleeve, and a cam follower rotatable with the shaft and cooperating with the cam member, in combination with a driven member interposed between the gripping members to be gripped and driven thereby.

13. In a power transmission mechanism, a driving shaft provided with two spaced apart abutments between which are positioned the following elements:—a primary sleeve rotatably embracing the shaft and carrying spaced apart gripping and cam members which are relatively axially movable and rotatable as a unit, a secondary sleeve embracing the primary sleeve between said cam and gripping members and carrying a gripping member opposed to and spaced from the gripping member of the primary sleeve, said secondary sleeve being slidable longitudinally of and rotatable with the primary sleeve, a spring coaxial with the shaft and interposed between the cam member and the gripping member of the secondary sleeve, and a cam follower rotatable with the shaft and cooperating with the cam member, in combination with a driven member interposed between the gripping members to be gripped and driven thereby, one of said two spaced apart abutments on the shaft being adjustable longitudinally of the shaft.

14. In a power transmission mechanism, a driving shaft provided with two spaced apart abutments between which are positioned the following elements:—a primary sleeve rotatably embracing the shaft and carrying spaced apart gripping and cam members which are relatively axially movable and rotatable as a unit, a secondary sleeve embracing the primary sleeve between said cam and gripping members and carrying a gripping member opposed to and spaced from the gripping member of the primary sleeve, said secondary sleeve being slidable longitudinally of and rotatable with the primary sleeve, a spring coaxial with the shaft and interposed between the cam member and the gripping member of the secondary sleeve, and a cam follower rotatable with the shaft and cooperating with the cam member, in combination with a driven member interposed between the gripping members to be gripped and driven thereby, said cam follower being secured to the shaft by one of said abutments of said shaft.

15. In a power transmission mechanism, the combination of a driving shaft, a pair of gripping members mounted on said shaft in spaced apart relation and free for conjoint rotation relative to the shaft, a driven member interposed between the gripping members to be gripped and driven thereby, means for securing the gripping members against rotation relative to one another while permitting relative axial movement between said members into and out of engagement with said driven member, a spring cooperating with said gripping members and adapted, when placed under compression, to force the gripping members into cooperative resilient driving relation with the driven member, a cam member secured to the gripping members against relative rotation, and a cam follower mounted on said shaft and rotatable therewith to place said spring under compression and effect said resilient driving relation when the shaft is rotated relatively to the gripping members.

16. In a power transmission mechanism, the combination of a driving shaft, a pair of gripping members mounted on said shaft in spaced apart relation and free for conjoint rotation relative to the shaft, a driven member interposed between the gripping members to be gripped and driven thereby, means for securing the gripping members against rotation relative to one another while permitting relative axial movement between said members into and out of engagement with said driven member, a spring cooperating with said gripping members and adapted, when placed under compression, to force the gripping members into cooperative resilient driving relation with the driven member, a cam member secured to the gripping members against relative rotation, a cam follower mounted on said shaft and rotatable therewith to place said spring under compression and effect said resilient driving relation when the shaft is rotated relatively to the gripping members, and an abutment on said cam member, the elements depending upon and operated through the medium of said cam member and following being so related with respect to the remaining elements with which they cooperate as to utilize the mass embodied in the same to cause a retardation of said elements as a whole to present a resistance to the operation of the follower under such balance between said mass and the force operating said follower as to cause the said follower to ride on said cam member until it is definitely retarded by said abutment.

17. In a power transmission mechanism, the combination of a power shaft, a sleeve having a smooth cylindrical bore embracing said shaft and free for rotation thereon, a pair of spaced apart gripping members mounted on said sleeve against rotation relative to the sleeve or to one another, one of said members being slidable axially on the sleeve, a cam member also mounted on the sleeve for axial sliding movement thereon and locked against rotation relative thereto, a cam follower co-acting with the cam member and secured directly to the shaft to be bodily rotated thereby, a resilient element interposed between the cam member and the adjacent gripping member, and a driven member interposed between the spaced apart gripping members, the sum of the mass of said sleeve and all parts carried thereby being such that, when the shaft is rapidly accelerated, the inertia of said parts will cause said parts to lag, whereby the follower is caused to ride upon the cam member for the purpose of moving the gripping members into resilient driving engagement with the driven member.

18. In a power transmission mechanism, the combination of a power shaft, a primary sleeve having a smooth cylindrical bore embracing said shaft and free for rotation thereon, a pair of spaced apart gripping members mounted on said sleeve against rotation relative to the sleeve or to one another, one of said members being slidable axially on the sleeve, the axial slidable member being provided with a cam face, a cam follower coacting with said cam face and secured directly to the shaft to be bodily rotated thereby, and a driven member interposed between the gripping members, the mass of the sleeve and gripping members being such that when the shaft is rapidly accelerated the inertia of said sleeve and gripping members will cause the same to lag, whereby the follower is caused to ride upon said cam face for the purpose of moving the gripping members into driving engagement with the interposed driven member.

19. In a power transmission mechanism, the combination of a driving shaft, a primary sleeve mounted on said shaft for rotation relative to said shaft, said primary sleeve being provided adjacent one end with an enlargement constituting a gripping member and having a gripping face, a secondary sleeve embracing the primary sleeve and splined thereto for longitudinal movement on the sleeve, said secondary sleeve being provided at the end adjacent the gripping member of the primary sleeve with a gripping face spaced from and adapted to cooperate with the gripping face of the gripping member of the primary sleeve, the opposite end of said secondary sleeve being provided with cam faces, a follower carried by the shaft and rotatable therewith, said follower coacting with the cam faces of the secondary sleeve, and a driven member extending between and adapted to be gripped and driven by the gripping faces of the primary and secondary sleeves.

20. In a power transmission mechanism, the combination of a power shaft, a primary sleeve having a smooth cylindrical bore embracing said shaft and free for rotation thereon, a pair of spaced apart gripping members mounted on said sleeve against rotation relative to the sleeve or to one another, one of said members being slidable axially on the sleeve, the axial slidable member being provided with a cam face, a cam follower coacting with said cam face and secured directly to the shaft to be bodily rotated thereby, and a driven member interposed between the gripping members, the mass of the sleeve and gripping members being such that when the shaft is rapidly accelerated the inertia of said sleeve and gripping members will cause the same to lag, whereby the follower is caused to ride upon said cam face for the purpose of moving the gripping members into driving engagement with the interposed driven member, the relation of said coacting parts being such that the gripping members and the driven member remain at rest until driving engagement is accomplished.

21. In a power transmission mechanism, the combination of a driving shaft, a primary sleeve mounted on said shaft for rotation relative to said shaft, said primary sleeve being provided adjacent one end with an enlargement constituting a gripping member and having a gripping face, a secondary sleeve embracing the primary sleeve and splined thereto for longitudinal movement on the sleeve, said secondary sleeve being provided at the end adjacent the gripping member of the primary sleeve with a gripping face spaced from and adapted to cooperate with the gripping face of the gripping member of the primary sleeve, the opposite end of said secondary sleeve being provided with cam faces, a follower carried by the shaft and rotatable therewith, said follower coacting with the cam face of the secondary sleeve, and a driven member extending between and adapted to be gripped and driven by the gripping faces of the primary and secondary sleeves, the relation of said co-acting parts being such that the gripping members and the driven member remain at rest until driving engagement is accomplished.

22. A starting mechanism for internal combustion engines embodying an axially shiftable driving shaft, a pair of first and second gripping members mounted on said shaft and having gripping faces in spaced apart relation, said gripping members being relatively axially movable and locked against rotation with respect to one another, but mounted for conjoint rotation relative to the shaft, a cam face on the first gripping member, a cam follower carried by and rotatable with the shaft and cooperating with said face to act upon and force the first gripping member in the direction of the second gripping member upon relative rotation between the shaft and gripping members in a predetermined direction, and means coacting with the shaft to force the second gripping member toward the first gripping member when the shaft is moved axially by reaction of the cam face against the follower upon relative rotation in said predetermined direction, and a driven member interposed between the spaced apart gripping faces to be gripped and driven thereby.

23. A starting mechanism for internal combustion engines embodying an axially shiftable driving shaft, a pair of first and second gripping members mounted on said shaft and having gripping faces in spaced apart relation, said gripping members being relatively axially movable and locked against rotation with respect to one another, but mounted for conjoint rotation relative to the shaft, a cam face on the first gripping member, a cam follower carried by and rotatable with the shaft and cooperating with said face to act upon and force the first gripping member in the direction of the second gripping member upon relative rotation between the shaft and gripping members in a predetermined direction, and means coacting with the shaft to force the second gripping member toward the first gripping member when the shaft is moved axially by reaction of the cam face against the follower upon relative rotation in said predetermined direction, a driven member interposed between the spaced apart gripping faces to be gripped and driven thereby, and means for normally maintaining the gripping faces free from engagement with the driven member when the shaft is in a condition of rest.

24. A starting mechanism for internal combustion engines embodying an axially shiftable power shaft, a sleeve mounted on said shaft for free rotation, an abutment associated with the shaft to preclude movement of the sleeve in one direction, a pair of gripping members carried by said sleeve, both of which gripping members are rotatable with the sleeve and locked against relative rotation with respect to one another, the gripping member remote from the abutment being provided with a cam face, a follower carried by the shaft for rotation therewith and adapted to cooperate with said cam face, a driven member interposed between the gripping members and said gripping members having gripping faces opposed to one another and adapted to grip and drive the driven member.

25. In a power transmission mechanism, the combination of a power shaft, a pair of gripping members free for axial movement with respect to one another and mounted coaxially upon the power shaft for rotary movement thereon and relative thereto, operative connections between the gripping members for forcing said gripping members toward one another, said operative connections including a cam, a cam follower and a resilient element, and a driven member interposed between said gripping members and adapted to be gripped and driven thereby when the resilient element has been placed under sufficient compression to effect a driving engagment between the gripping members and the driven member.

26. In a power transmission mechanism, the combination of a power shaft, a primary sleeve having a smooth cylindrical bore embracing said shaft and free for rotation thereon, a pair of spaced apart gripping members mounted on said sleeve and at least one of which members is fixed against rotation with respect to the sleeve, one of said members being slidable axially on the sleeve, the axial slidable member being provided with a cam face, a cam follower coacting with said cam face and secured directly to the shaft to be bodily rotated thereby, and a driven member interposed between the gripping members, the mass of the sleeve and gripping members being such that when the shaft is rapidly accelerated the inertia of said sleeve and gripping members will cause the same to lag, whereby the follower is caused to ride upon said cam face for the purpose of moving the gripping members into driving engagement with the interposed driven member.

27. A starting mechanism for internal combustion engines embodying an axially shiftable driving shaft, a pair of first and second gripping members mounted on said shaft and having gripping faces in spaced apart relation, said gripping members being relatively axially movable and both being mounted for rotation relative to the shaft, a cam face on the first gripping member, a cam follower carried by and rotatable with the shaft and cooperating with said face to act upon and force the first gripping member in the direction of the second gripping member upon relative rotation between the shaft and gripping members in a predetermined direction, and means coacting with the shaft to force the second gripping member toward the first gripping member when the shaft is moved axially by reaction of the cam face against the follower upon relative rotation in said predetermined direction, and a driven member interposed between the spaced apart gripping faces to be gripped and driven thereby.

28. A starting mechanism for internal combustion engines embodying an axially shiftable power shaft, a pair of abutments spaced apart on said shaft and at least one of which is secured against rotation to the shaft, a pair of spaced apart gripping members coaxial of said shaft between the abutments and both freely rotatable on said shaft, a cam follower carried by the said abutment which is secured against rotation to the shaft, the gripping member adjacent the follower being provided with a cam face adapted to cooperate with said follower, and a driven member interposed between the gripping members and said gripping members having adjacent gripping faces opposed to one another and adapted to grip and drive the driven member.

Signed by me at New York city this 1st day of December 1930.

ALEXANDER DOW.